US008860825B2

(12) United States Patent
Grundmann et al.

(10) Patent No.: US 8,860,825 B2
(45) Date of Patent: Oct. 14, 2014

(54) METHODS AND SYSTEMS FOR REMOVAL OF ROLLING SHUTTER EFFECTS

(75) Inventors: Matthias Grundmann, Atlanta, GA (US); Vivek Kwatra, Santa Clara, CA (US); Irfan Essa, Atlanta, GA (US)

(73) Assignee: Google Inc., Mountain View, CA (US)

( * ) Notice: Subject to any disclaimer, the term of this patent is extended or adjusted under 35 U.S.C. 154(b) by 211 days.

(21) Appl. No.: 13/611,023

(22) Filed: Sep. 12, 2012

(65) Prior Publication Data
US 2014/0071299 A1   Mar. 13, 2014

(51) Int. Cl.
*H04N 5/228* (2006.01)
*H04N 5/335* (2011.01)

(52) U.S. Cl.
USPC .................. 348/208.4; 348/208.1; 348/222.1; 348/296

(58) Field of Classification Search
CPC ..................................................... H04N 5/228
USPC ............................................ 348/208.4, 222.1
See application file for complete search history.

(56) References Cited

U.S. PATENT DOCUMENTS

| 7,433,497 | B2 | 10/2008 | Chen |
| 7,936,945 | B2 | 5/2011 | Soinio et al. |
| 8,054,335 | B2 | 11/2011 | Deng et al. |
| 2007/0002146 | A1 * | 1/2007 | Tico et al. .................. 348/208.1 |
| 2007/0154202 | A1 | 7/2007 | Lee et al. |
| 2009/0066800 | A1 | 3/2009 | Wei |
| 2010/0067865 | A1 | 3/2010 | Saxena et al. |
| 2011/0176014 | A1 * | 7/2011 | Hong et al. ................. 348/208.4 |
| 2011/0176043 | A1 * | 7/2011 | Baker et al. .................... 348/296 |
| 2011/0267514 | A1 * | 11/2011 | D'Angelo et al. ............ 348/296 |
| 2012/0092559 | A1 | 4/2012 | Ubillos |
| 2012/0105654 | A1 | 5/2012 | Kwatra et al. |

OTHER PUBLICATIONS

International Search Report & Written Opinion from International Application Serial No. PCT/US13/57382, dated Dec. 10, 2013, 14 pages.
Tomokazu Sato et al., "High-resolution video mosaicing for documents and photos by estimating camera motion," SPIE Proceeding, Computational Imaging II, May 21, 2004, vol. 5299, pp. 246-253.

* cited by examiner

*Primary Examiner* — Nhan T Tran
*Assistant Examiner* — Chan Nguyen
(74) *Attorney, Agent, or Firm* — Amin, Turocy & Watson, LLP

(57) ABSTRACT

Methods and systems for rolling shutter removal are described. A computing device may be configured to determine, in a frame of a video, distinguishable features. The frame may include sets of pixels captured asynchronously. The computing device may be configured to determine for a pixel representing a feature in the frame, a corresponding pixel representing the feature in a consecutive frame; and determine, for a set of pixels including the pixel in the frame, a projective transform that may represent motion of the camera. The computing device may be configured to determine, for the set of pixels in the frame, a mixture transform based on a combination of the projective transform and respective projective transforms determined for other sets of pixels. Accordingly, the computing device may be configured to estimate a motion path of the camera to account for distortion associated with the asynchronous capturing of the sets of pixels.

23 Claims, 11 Drawing Sheets

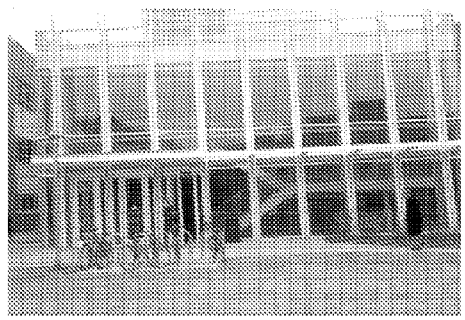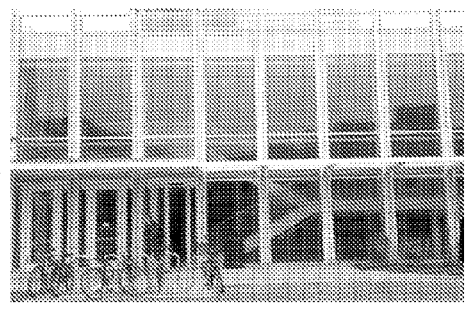
FIGURE 9A  FIGURE 9B
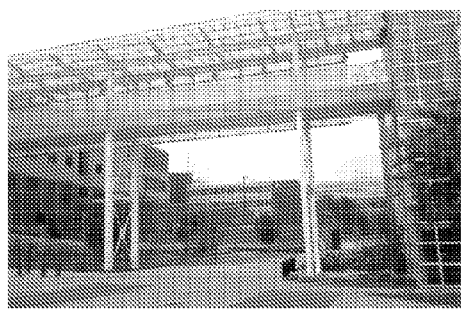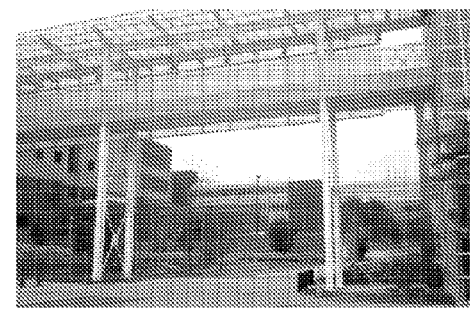
FIGURE 9C  FIGURE 9D

COMPUTER PROGRAM PRODUCT 1100

SIGNAL BEARING MEDIUM 1101

PROGRAM INSTRUCTIONS 1102

- DETERMINING IN A FRAME OF A VIDEO CAPTURED BY A CAMERA, FEATURES WITH A DISTINGUISHABLE GEOMETRIC CHARACTERISTIC, AND THE FRAME MAY INCLUDE A PLURALITY OF SETS OF PIXELS CAPTURED SEQUENTIALLY IN TIME

- DETERMINING, FOR A PIXEL REPRESENTING A FEATURE OF THE FEATURES IN THE FRAME, A CORRESPONDING PIXEL REPRESENTING THE FEATURE IN A CONSECUTIVE FRAME IN THE VIDEO

- DETERMINING, FOR A SET OF PIXELS INCLUDING THE PIXEL IN THE FRAME, A PROJECTIVE TRANSFORM BASED ON (I) A FIRST POSITION OF THE CAMERA AT WHICH THE SET OF PIXELS IS CAPTURED, AND (II) A SECOND POSITION OF THE CAMERA AT WHICH A CORRESPONDING SET OF PIXELS INCLUDING THE CORRESPONDING PIXEL IN THE CONSECUTIVE FRAME IS CAPTURED, AND THE PROJECTIVE TRANSFORM MAY REPRESENT MOTION OF THE CAMERA FROM THE FIRST POSITION TO THE SECOND POSITION

- DETERMINING, FOR THE SET OF PIXELS IN THE FRAME, A MIXTURE TRANSFORM BASED ON A COMBINATION OF THE PROJECTIVE TRANSFORM AND RESPECTIVE PROJECTIVE TRANSFORMS DETERMINED FOR OTHER SETS OF PIXELS INCLUDING THE FEATURES IN THE FRAME

- ESTIMATING A MOTION PATH OF THE CAMERA BASED ON THE MIXTURE TRANSFORM AND RESPECTIVE MIXTURE TRANSFORMS DETERMINED FOR THE OTHER SETS OF PIXELS TO ACCOUNT FOR DISTORTION ASSOCIATED WITH THE SEQUENTIAL CAPTURING OF THE PLURALITY OF SETS OF PIXELS IN THE FRAME

| COMPUTER READABLE MEDIUM 1103 | COMPUTER RECORDABLE MEDIUM 1104 | COMMUNICATIONS MEDIUM 1105 |

FIGURE 11

METHODS AND SYSTEMS FOR REMOVAL OF ROLLING SHUTTER EFFECTS

BACKGROUND

Video stabilization techniques may be used to improve recorded videos. With video cameras, camera shake can cause visible frame-to-frame jitter in a recorded video. For example, a handheld recorded video may be perceptibly shakier than a video recorded using a tripod-mounted camera (or other stabilization equipment, such as camera dollies or steady-cams) due to motion of the operator holding the camera during recording. However, recording videos using handheld video recording may enable more opportunities for filming.

Video stabilization techniques may be used to create a stable version of a casually shot video (e.g., a video recorded on a device with little or no stabilization equipment). Video stabilization techniques generally attempt to render the recorded video as if the video would have been recorded from a smooth or stable camera path.

SUMMARY

The present application discloses methods and systems for removal of rolling shutter effects from a video. In one aspect, a method is described. The method may comprise determining, by a computing device, in a frame of a video captured by a camera, features with a distinguishable geometric characteristic. The frame includes a plurality of rows of pixels captured sequentially in time. The method also may comprise determining, for a pixel representing a feature of the features in the frame, a corresponding pixel representing the feature in a consecutive frame in the video. The method further may comprise determining, for a set of rows of pixels including the pixel in the frame, a projective transform based on (i) a first position of the camera at which the set of rows of pixels is captured, and (ii) a second position of the camera at which a corresponding set of rows of pixels including the corresponding pixel in the consecutive frame is captured. The projective transform may represent motion of the camera from the first position to the second position. The method also may comprise determining, for the set of rows of pixels in the frame, a mixture transform based on a combination of the projective transform and respective projective transforms determined for other sets of rows of pixels including the features in the frame. The method further may comprise estimating, by the computing device, a motion path of the camera, based on the mixture transform and respective mixture transforms determined for the other sets of rows of pixels to account for distortion associated with the sequential capturing of the plurality of rows of pixels in the frame.

In another aspect, a non-transitory computer readable medium having stored thereon instructions executable by a computing device to cause the computing device to perform functions is described. The functions may comprise determining in a frame of a video captured by a camera, features with a distinguishable geometric characteristic. The frame may include a plurality of sets of pixels captured sequentially in time. The functions also may comprise determining, for a pixel representing a feature of the features in the frame, a corresponding pixel representing the feature in a consecutive frame in the video. The functions further may comprise determining, for a set of pixels including the pixel in the frame, a projective transform based on (i) a first position of the camera at which the set of pixels is captured, and (ii) a second position of the camera at which a corresponding set of pixels including the corresponding pixel in the consecutive frame is captured. The projective transform may represent motion of the camera from the first position to the second position. The functions also may comprise determining, for the set of pixels in the frame, a mixture transform based on a combination of the projective transform and respective projective transforms determined for other sets of pixels including the features in the frame. The functions further may comprise estimating a motion path of the camera based on the mixture transform and respective mixture transforms determined for the other sets of pixels to account for distortion associated with the sequential capturing of the plurality of sets of pixels in the frame.

In still another aspect, a system is described. The system may comprise a feature extraction module configured to determine, in a frame of a video captured by a camera, features with a distinguishable geometric characteristic. The frame may include a plurality of sets of pixels captured sequentially in time. The feature extraction module also may be configured to determine, for a pixel representing a feature of the features in the frame, a corresponding pixel representing the feature in a consecutive frame in the video. The system also may comprise a transformation module in communication with the feature extraction module and configured to determine, for a set of pixels including the pixel in the frame, a projective transform based on (i) a first position of the camera at which the set of pixels is captured and (ii) a second position of the camera at which a corresponding set of pixels including the corresponding pixel in the consecutive frame is captured. The projective transform may represent motion of the camera from the first position to the second position. The transformation module also may be configured to determine, for the set of pixels in the frame, a mixture transform based on a combination of the projective transform and respective projective transforms determined for other sets of pixels including the features in the frame. The system further may comprise a camera path estimation module in communication with the feature extraction module and the transformation module and configured to estimate a motion path of the camera based on the mixture transform and respective mixture transforms determined for the other sets of pixels to account for distortion associated with the sequential capturing of the plurality of sets of pixels in the frame.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 9A-9B illustrates an example of rolling shutter skew removal from frames of a video, in accordance with an embodiment.

FIGS. 9C-9D illustrates an example of rolling shutter wobble removal from frames of a video, in accordance with an embodiment.

FIG. 11 is a schematic illustrating a conceptual partial view of an example computer program product that includes a computer program for executing a computer process on a computing device, arranged according to at least some embodiments presented herein.

DETAILED DESCRIPTION

Figure 1A:
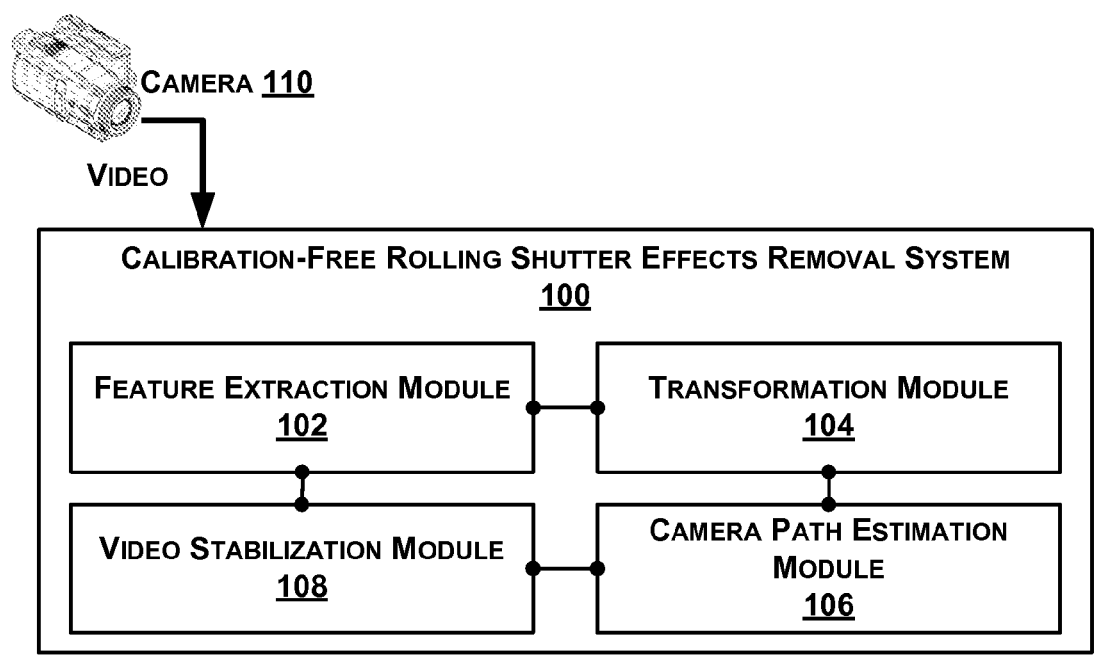
FIG. 1A illustrates a block diagram of an example calibration-free rolling shutter effects removal system, in accordance with an embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Rolling shutter is a method of image or video acquisition in which a frame is recorded not from a snapshot of a single point in time, but rather by scanning across the frame either vertically or horizontally. Thus, not all parts of the image may be recorded at the same time, even though the frame may be displayed at the same time during playback. This is in contrast with global shutter in which the frame as a whole may be exposed for a given time window. In examples, rolling shutter may produce predictable distortions of fast-moving objects (or fast-moving camera) or when an imaging sensor of the camera captures rapid flashes of light.

Rolling shutter may be implemented by rolling (moving) a shutter of the camera across an exposable image area instead of exposing the image area as a whole at the same time. The shutter could be either mechanical or electronic. Rolling shutter methods may cause the imaging sensor to continue to gather photons during an image or video acquisition process, thus increasing sensitivity. Rolling shutter, however, can cause such effects as wobble, skew, smear, and partial exposure.

Wobble may occur in hand-held camera shots, and may be worse when the camera is vibrating, due to being attached to a moving vehicle, for instance. The rolling shutter may cause an image to wobble (compress and stretch different parts of the frame).

Skew may be described as a kind or one manifestation of wobble. The image may bend diagonally in one direction or another as the camera or subject moves from one side to another, exposing different parts of the image at different times.

Smear can be noticed when photographing or recording a video of a moving object like a fan or a propeller, for example. The smear of each blade may be caused by the propeller rotating at the same or near the same speed of capturing the frame by the camera. As an example, viewed perpendicular to a propeller spinning clockwise, the blades on the left side can appear thinner than usual while the blades on the right side can appear thicker and can even appear as if the blades are not connected at the center of the propeller.

If a camera flash occurs in the shot, quick nature of the flash may be present for some, not all, rows of pixels in a given frame, and thus can cause partial exposure. As an example, a top third of the image may be brightly lit by the flash, while a bottom two thirds of the image may be dark and unlit.

Magnitude of distortion occurring may depend on speed of capturing of rows or sets of pixels, i.e., readout speed. Higher readout speeds may cause less distortion. In some examples, readout speed may be determined a-priori for the camera or may be calibrated from a video sequence recorded by the camera. A computing device may be configured to process the video with the a-priori knowledge of camera characteristics to compensate for and remove rolling shutter effects. However, a-priori knowledge of the camera characteristics or calibration results may not be available and a calibration-free rolling shutter effects removal method may be implemented by the computing device.

Referring now to the Figures, FIG. 1A illustrates a block diagram of an example calibration-free rolling shutter effects removal system 100. The system 100 includes a feature extraction module 102, a transformation module 104 in communication with the feature extraction module 102, a camera path estimation module 106 in communication with the feature extraction module 102 and the transformation module 104, and the video stabilization module 108 in communication with the feature extraction module 102, and the camera path estimation module 106. The system 100 may be configured to receive a video recorded by a camera 110, and to perform calibration-free rolling shutter effects removal and video stabilization processes on the video.

For example, the feature extraction module 102 may be configured to receive a video including a sequence of frames and captured by the camera 110, and the feature extraction module 102 may be configured to determine, in a frame of the video, features with a distinguishable geometric characteristic. The distinguishable geometric characteristic, for example, may include a corner formed by two converging lines depicted in the frame. In another example, the distinguishable geometric characteristic may include a location at an intersection of two lines depicted in the frame. Other examples of the distinguishable geometric characteristic are possible.

In an example, the frame may include a plurality of sets (e.g., row or columns) of pixels captured asynchronously (e.g., sequentially in time) using an example rolling shutter method. The feature extraction module 102 also may be configured to, for a pixel representing a feature of the features in the frame, a corresponding pixel representing the feature in a consecutive frame in the video.

The transformation module 104 may be configured to determine, for a set of pixels including the pixel in the frame, a projective transform based on (i) a first position of the camera at which the set of pixels is captured, and (ii) a second position of the camera at which a corresponding set of pixels including the corresponding pixel in the consecutive frame is captured. The projective transform may describe or represent motion of the camera from the first position to the second position. The transformation module 104 also may be configured to determine respective projective transforms for other sets of pixels including the features in the frame. Further, the transformation module 104 may be configured to determine, for the set of pixels in the frame, a mixture transform based on a combination of the projective transform and the respective projective transforms determined for the other sets of pixels including the features in the frame. The transformation module 104 further may be configured to determine respective mixture transforms for the other sets of pixels including the features in the frame.

The camera path estimation module 106 may be configured to estimate a motion path of the camera based on the mixture transform and the respective mixture transforms determined for the other sets of pixels to account for distortion associated with the asynchronous or sequential capturing of the plurality of sets of pixels in the frame. As an example, the camera path estimation module 106 may be configured to track the features in the plurality of frames of the video. Motion models of varying degrees of freedom (e.g., translation, similarity, affine, perspective transforms, and mixture transforms as described above) may be fit to the tracked features to estimate the motion path of the camera between two frames, and mixture transforms may account for rolling shutter distortion. The motion models can be transformed to a common coordinate system and concatenated to yield an estimated camera path over all frames of the video.

The video stabilization module 108 may be configured to unwarp or remove the rolling shutter distortions from the video based on the estimated motion path of the camera. Further, in some examples, the video stabilization module 108 may be configured to stabilize the video by performing post-processing techniques. The video stabilization module 108 may be configured to estimate a new steady/smooth camera path, and to recast the video from a viewpoint of the new smooth camera path. The steady or smooth camera path may dampen high-frequency jitter and remove low-frequency distortions that occur during handheld panning shots or videos recorded by a moving camera, for example.

Components of the system 100 may be configured to work in an interconnected fashion with each other and/or with other components coupled to respective systems. One or more of the described functions or components of the system 100 may be divided up into additional functional or physical components, or combined into fewer functional or physical components. In some further examples, additional functional and/or physical components may be added to the examples illustrated by FIG. 1. Still further, any of the feature extraction module 102, the transformation module 104, the camera path estimation module 106, and/or the video stabilization module 108 may include or be provided in the form of a processor (e.g., a micro processor, a digital signal processor (DSP), etc.) configured to execute program code including one or more instructions for implementing logical functions described herein. The system 100 may further include any type of computer readable medium (non-transitory medium) or memory, for example, such as a storage device including a disk or hard drive, to store the program code. In other examples, the system 100 may be included within other systems.

Figure 1B:
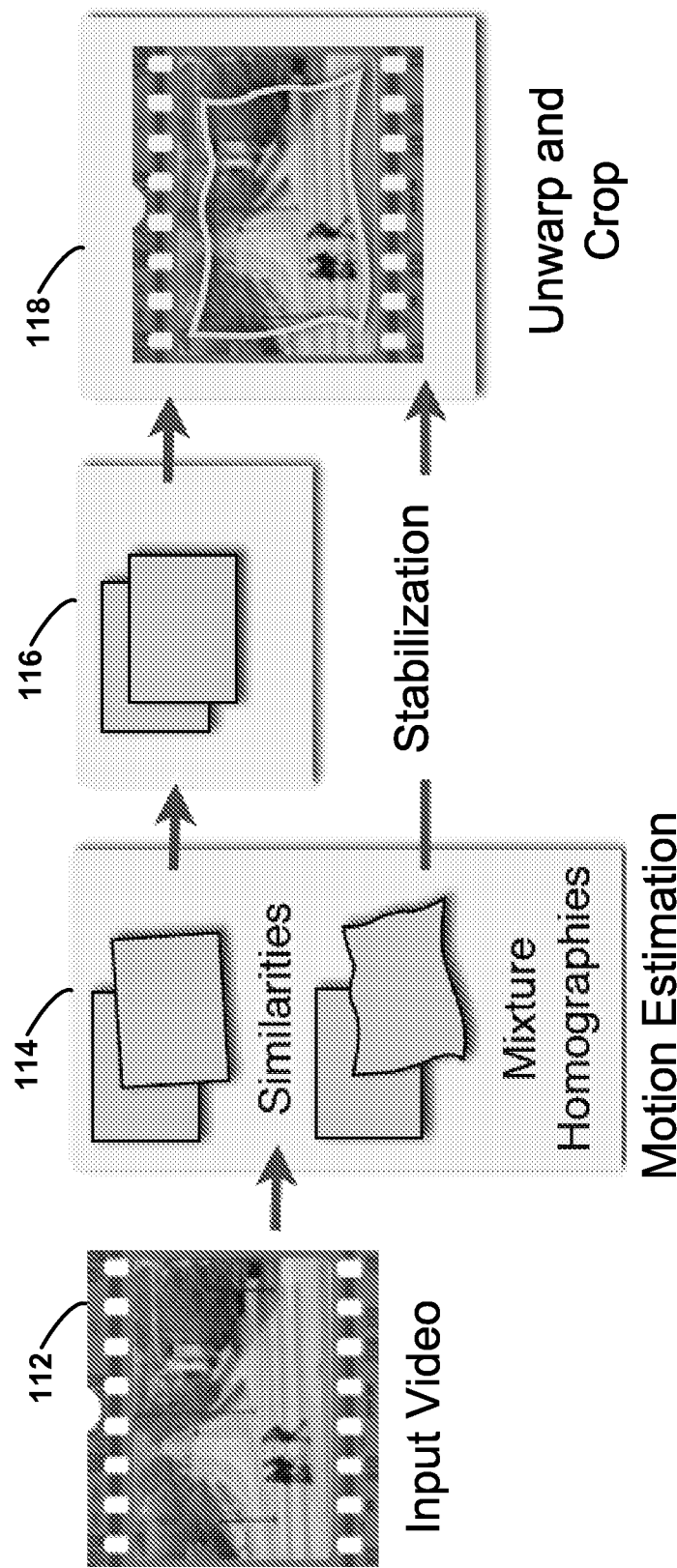
FIG. 1B illustrates another block diagram of an example calibration-free rolling shutter effects removal system, in accordance with an embodiment.

FIG. 1B illustrates another block diagram of an example calibration-free rolling shutter effects removal system, in accordance with an embodiment. A video 112 may be received at a computing device that may include the modules 102, 104, 106, and 108 described in FIG. 1A. The computing device may be configured to perform rolling shutter effects removal without prior calibration or knowledge of camera characteristics of the camera used to capture the video 112.

The computing device may be configured to perform motion estimation, by first matching features having a distinguishable geometric characteristic across frame pairs to obtain potential matches. Further, the computing device may be configured to perform outlier rejection to remove pixels with locally inconsistent motion and retain features with similar moving features in a local neighborhood. At block 114, the computing device may be configured to fit homography mixtures (e.g., mixture transforms as described with respect to FIG. 1A) to the potential matches obtaining a parametric model for motion and rolling shutter distortion between frames. At block 114, the computing device also may be configured to estimate four degrees of freedom similarities that account for instability (e.g., vibration or shake) of an original camera path. At block 116, the computing device may be configured to determine a modified smooth camera path and a crop window transform to stabilize the camera path over time. At block 118, the computing device may be configured to use the estimated homography mixtures to unwarp the rolling shutter distortions and the crop window transform is applied to stabilize the video.

Figure 2:
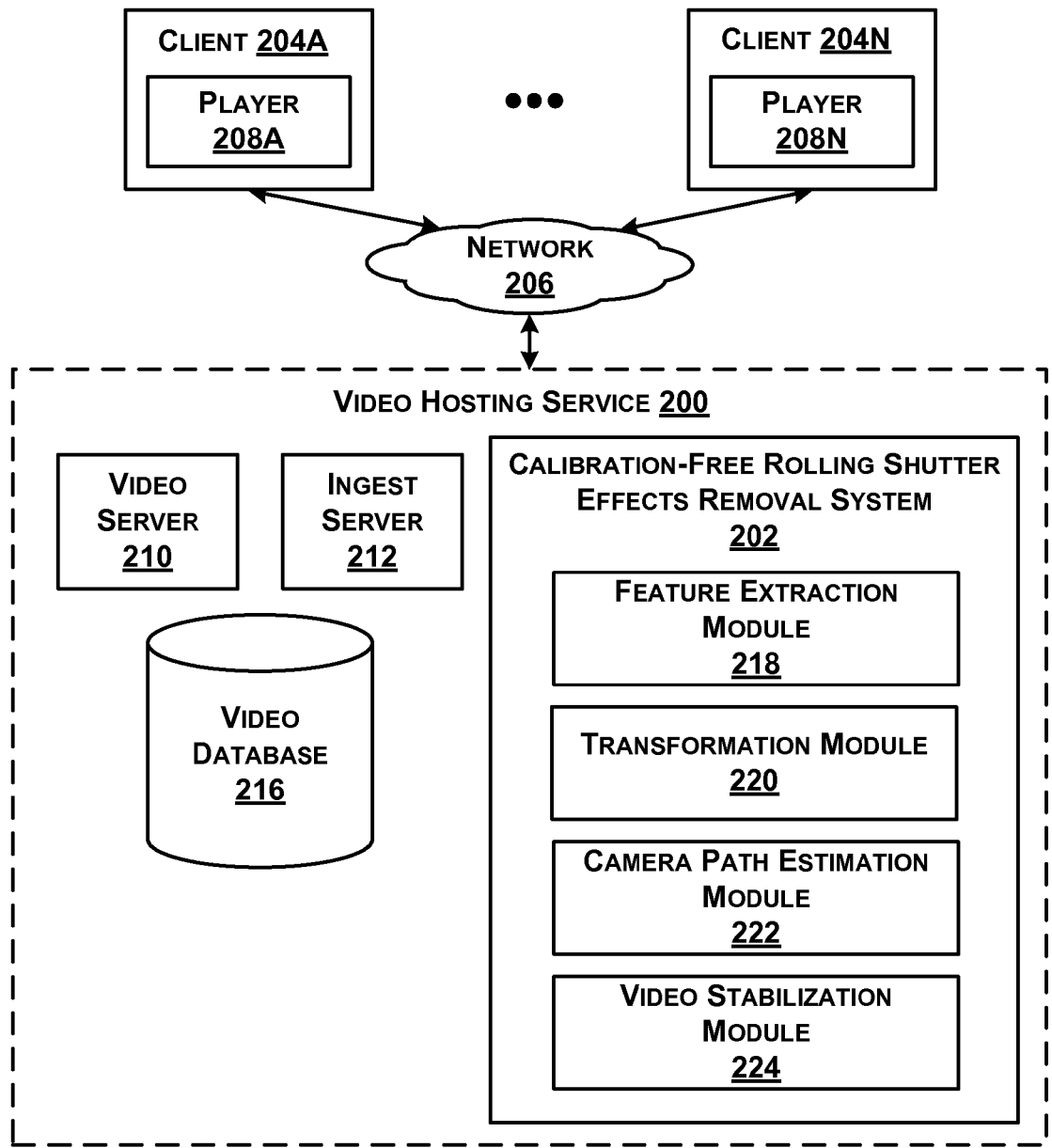
FIG. 2 is a block diagram illustrating an example system view of a video hosting service that includes the example calibration-free rolling shutter effects removal system, in accordance with an embodiment.

FIG. 2 is a block diagram illustrating an example system view of a video hosting service that includes the example calibration-free rolling shutter effects removal system, in accordance with an embodiment. Multiple users/viewers may use clients 204A-N to send video hosting requests to the video hosting service 200, such as to upload videos to a video hosting website, and to receive the requested services from the video hosting service 200. The video hosting service 200 may be configured to communicate with the one or more clients 204A-N via a network 206. The video hosting service 200 may receive the video hosting service requests from the clients 204A-N over wired or wireless connections.

Turning to individual entities illustrated in FIG. 2, each client 204A-N may be used by a user to request video hosting services. For example, a user can use the client 204A to send a request for uploading a video for sharing, or playing a video. The clients 204A-N can be any type of computer device, such as a personal computer (e.g., desktop, notebook, tablet, laptop) computer, as well as devices such as a mobile telephone, personal digital assistant, or IP enabled video player. The clients 204A-N may include a processor, a display device (or output to a display device), and a local storage, such as a hard drive or flash memory device to which the clients 204A-N store data used by the user in performing tasks, and a network interface for coupling to the video hosting service 200 via the network 206.

The clients 204A-N may include video players 208A-N (e.g., the Flash™ player from Adobe Systems, Inc., or a proprietary one) for playing a video stream. The video players 208A-N may be standalone applications, or a plug-in to other applications such as a network or Internet browser. Where the client 204A-N is a general purpose device (e.g., a desktop computer, mobile phone), the players 208A-N may be implemented as software executed by the computer. Where the clients 204A-N are dedicated devices (e.g., dedicated video players), the players 208A-N may be implemented in hardware, or a combination of hardware and software. The players 208A-N may include user interface controls (and corresponding application programming interfaces) for selecting a video feed, starting, stopping, and rewinding a video feed. Also, the players 208A-N can include in a user interface a video display format selection configured to indicate a video display format (e.g., a standard definition TV or a high-definition TV). Other types of user interface controls (e.g., buttons, keyboard controls) can be used as well to control the playback and video format selection functionality of the players 208A-N.

The network 206 enables communications between the clients 204A-N and the video hosting service 200. In one example, the network 206 is the Internet, and uses standardized internetworking communications technologies and protocols, known now or subsequently developed that enable the clients 204A-N to communicate with the video hosting service 200. In another example, the network 206 may be a wireless cellular network that enables wireless communication between the clients 204A-N and the video hosting service 200.

The video hosting service 200 comprises a calibration-free rolling shutter effects removal system 202, a video server 210, an ingest server 212, and a video database 216. The video server 210 may be configured to serve videos from the video database 216 in response to user video hosting service requests. The ingest server 212 may be configured to receive user uploaded videos and store the videos in the video database 216. The video database 216 may be configured to store user uploaded videos and videos processed by the calibration-free rolling shutter effects removal system 202. In one example, the video database 216 stores a large video corpus.

The calibration-free rolling shutter effects removal system 202 may include a feature extraction module 218, a transformation module 220, a camera path estimation module 222, and a video stabilization module 224. The system 202 may be configured to receive user uploaded videos from the ingest server 212, and to perform video stabilization of the videos.

The video hosting service 200 may be configured to receive a video from a client of the clients 204A-N, and receive a single command by a single action of a user of the client requesting a stabilized video that is free of rolling shutter effects. Based on the single command, the calibration-free rolling shutter effects removal system 202 coupled to the video hosting service 200 may be configured to process the video to remove rolling shutter effects and stabilize the video. A stabilized modified video that is free of rolling shutter effects may then be provided to the user.

Figure 3:
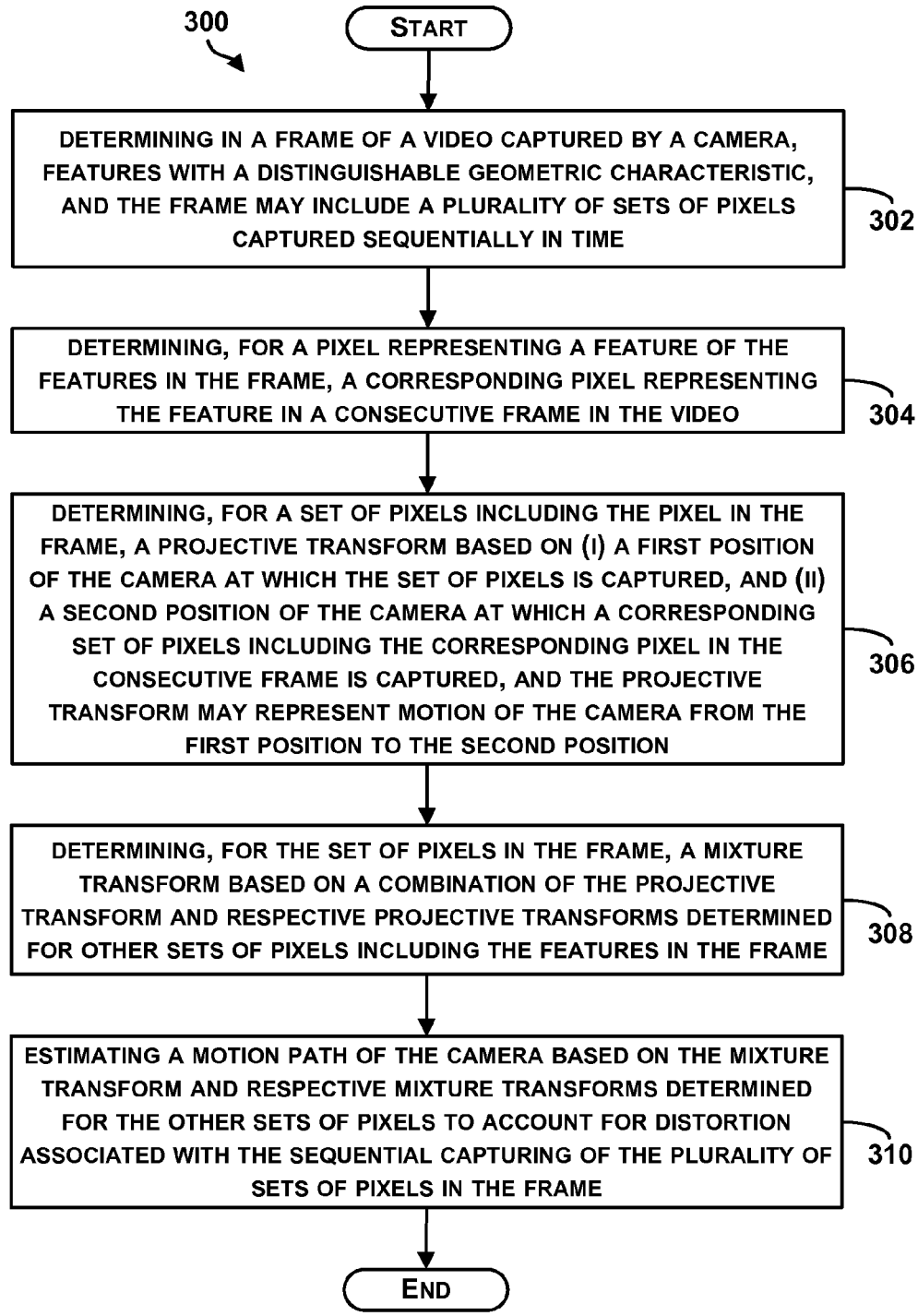
FIG. 3 is flow charts of an example method for removal of rolling shutter effects, in accordance with an embodiment.

FIG. 3 is flow charts of an example method 300 for rolling shutter removal, in accordance with an embodiment. The method 300 shown in FIG. 3 presents an example method that, for example, can be used with the systems 100 and 200, and may be performed by a device, a server, or a combination of the device and the server.

The method 300 may include one or more operations, functions, or actions as illustrated by one or more of blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes determining, in a frame of a video captured by a camera, features with a distinguishable geometric characteristic, and the frame may include a plurality of sets of pixels captured sequentially in time. A camera may have recorded a video, for example, and the video may have been uploaded to and received at a computing device, such as a computer, laptop, mobile phone, etc., or a server. The video may include a sequence of frames. Each frame may include a plurality of sets of pixels. The sets of pixels may be rows or columns of pixels, for example. For illustration of the method 300, rows of pixels will be used herein to represent the sets of pixels as an example and without loss of generality. The frames may have been acquired by the camera with a rolling shutter method. i.e., the rows of pixels may have been captured sequentially in time (asynchronously).

The computing device may be configured to determine features or locations that can be tracked in frames of the video. For example, the computing device may be configured to identify features, in a frame of the video, that have a distinguishable geometric characteristic. As an example, the computing device may be configured to determine corners at pixel locations, i.e., a location where two lines depicted in the frame converge (e.g., the location where two sides of a building intersect) where both eigenvalues of a second moment matrix of pixel intensities are above a pre-defined threshold. The threshold may be chosen with respect to a maximum eigenvalue across all pixels, effectively imposing a frame-global threshold. Corners are used as an example for illustration only, and features with other geometric characteristics can be used.

Figure 4A:
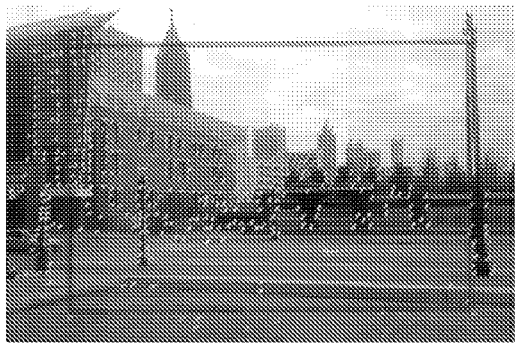
FIG. 4A illustrates features in an example frame of a video when the frame is considered globally for determining the features, in accordance with an embodiment.

FIG. 4A illustrates features in an example frame of a video when the frame is considered globally for determining the features, in accordance with an embodiment. Dots in the frame depicted in FIG. 4A represent the features identified or extracted by applying a frame-global threshold. However, few features may be extracted using the frame-global threshold, for highly textured regions or objects (e.g., buildings) may bias the frame-global threshold against low textured regions such as sky, grass, or a road. To obtain a higher density of features in the frame, the frame may be divided into a grid of bins, and each bin may be assigned a local threshold instead of using a global threshold.

Figure 4B:
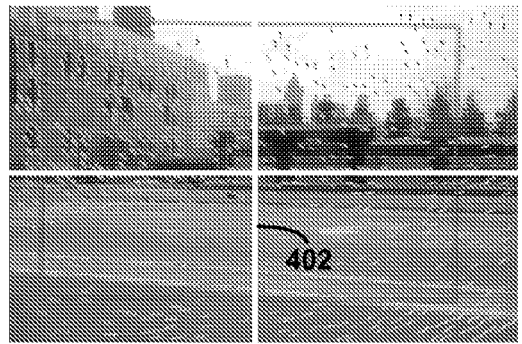
FIG. 4B illustrates features in the example frame when the frame is divided, and the features are determined locally, in accordance with an embodiment.

FIG. 4B illustrates features in the example frame when the frame is divided, and the features are determined locally, in accordance with an embodiment. FIG. 4B illustrates a grid 402 of 4×4 equally sized bins, with a local threshold assigned for each bin. It is noted that a number of dots representing features in FIG. 4B is larger than a respective number of dots representing respective features in FIG. 4A, i.e., FIG. 4B illustrates a more dense coverage of identified features even in low textured or low contrast regions such as the sky and grass portions depicted in the frame.

Further, the computing device may be configured to perform outlier rejection locally within the bins. As an example, features that deviate from a mean translation in a bin more than 2 pixels may be rejected.

To prevent aliasing, several grids across different resolutions and offsets can be used. In an example, for a grid of size X, N cells having square bins of size $$X_i = \frac{X}{2^i}, i = 0 \ldots N-1$$

can be created. To avoid aliasing issues, each grid may be shifted in x and y separately by K offsets of the form $$j \cdot \frac{X_i}{K}, j = 0 \ldots K-1$$

giving a total of $K^2 N$ grids.

Figure 5A:
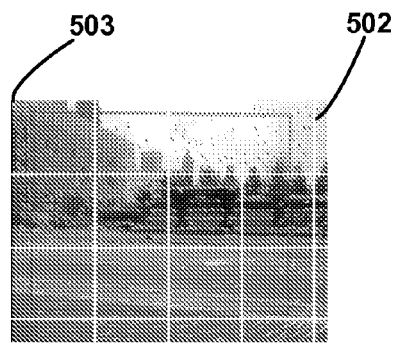
FIGS. 5A-5D illustrate the example frame and grids with different offsets and resolutions, in accordance with an embodiment.
Figure 5B:
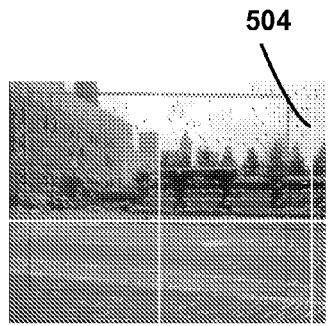
Figure 5C:
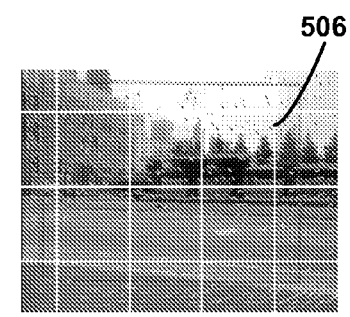
Figure 5D:
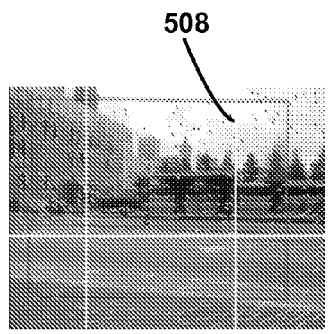

FIGS. 5A-5D illustrate the example frame and grids with different offsets and resolutions, in accordance with an embodiment. FIG. 5A shows a grid 502 with square bins aligned to top-left frame corner 503. FIG. 5B shows a grid 504 with square bins of half the resolution of grid 502. FIG. 5C shows a grid 506 that is the same as grid 502, but shifted in x direction. FIG. 5D shows a grid 508 that is the same as grid 504, but shifted in x and y directions. Other examples are possible.

Referring back to FIG. 3, at block 304, the method 300 includes determining, for a pixel representing a feature of the features in the frame, a corresponding pixel representing the feature in a consecutive frame in the video. The computing device may be configured to match the features or pixels representing the features across frames of the video. In an example, the computing device may be configured to track the features using tracking software, such as pyramidical Lucas-Kanade feature tracking software. The features may be tracked from frame to frame using any number of methods. For example, if the video is a sequence of images, $F_1, F_2, \ldots F_n$, video frame pairs may be represented by $(F_i, F_{i+1})$, and feature pairs between video frames may be extracted (e.g., for each feature or pixel x in frame $F_i$, a corresponding feature or pixel y is found in a consecutive frame $F_{i+1}$).

At block 306, the method 300 includes determining, for a set of pixels including the pixel in the frame, a projective transform based on (i) a first position of the camera at which the set of pixels is captured, and (ii) a second position of the camera at which a corresponding set of pixels including the corresponding pixel in the consecutive frame is captured, and the projective transform may represent motion of the camera from the first position to the second position. For each frame pair $(F_i, F_{i+1})$ the computing device may have determined matching feature or pixel locations as described at block 304 and may be configured to determine the projective transform to represent motion of the camera between the frame pair.

Figure 6A:
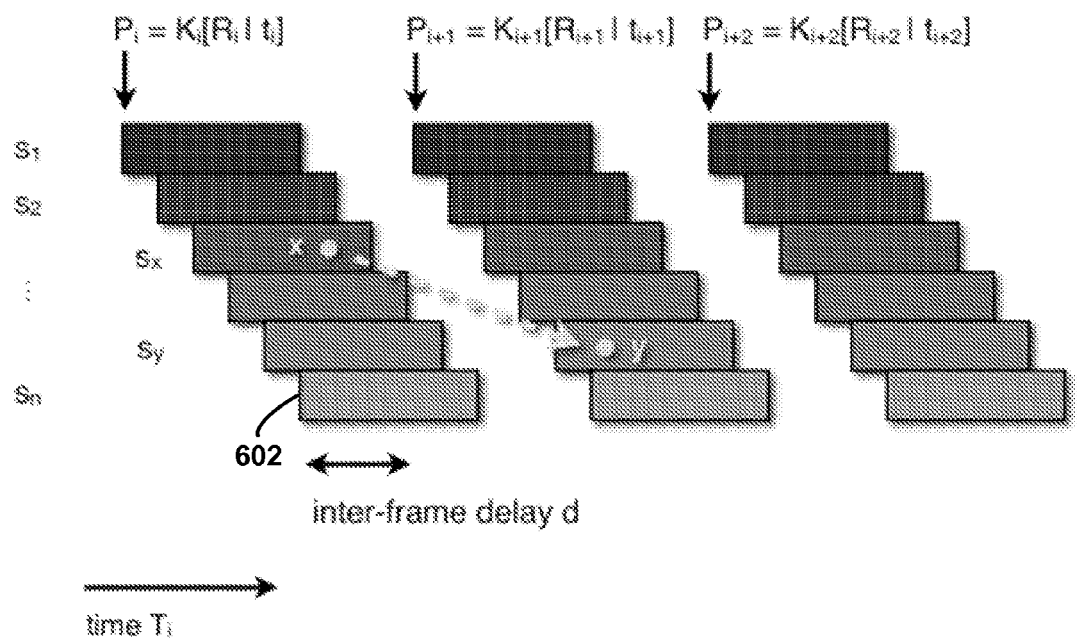
FIG. 6A illustrates an example for determination of a projective transform, in accordance with an embodiment.

FIG. 6A illustrates an example for determination of a projective transform, in accordance with an embodiment. To describe determination of the projective transform, a matched feature or pixel pair (x, y) illustrated in FIG. 6A is used as an example for illustration. Both features or pixels may be assumed to represent the same three-dimensional location X depicted in the frames $(F_i, F_{i+1})$ and are expressed in projective space $P^2$.

In an example case of global shutter capturing method, each row of a frame $F_i$ may be imaged at the same time $T_i$. Therefore, (x, y) are related by $x=P_i X$, $y=P_{i+1} X$, where $P_i$ and $P_{i+1}$ represent corresponding projection matrices. Each projection matrix may be decomposed into an intrinsic camera matrix $K_i$ and a camera center's origin $t_i$ and orientation $R_i$ at frame i, i.e., $P_i = K_i[R_i|t_i]$. In an example case of pure rotation $(t_i = t_{i+1} = 0)$, the projection matrices are invertible and both frames are related by the relationship:

$$y = P_i P_{i+1}^{-1} y = K_i R_i R_{i+1}^T K_{i+1}^{-1} y \Rightarrow x = H_{i,i+1} y \qquad \text{Equation (1)}$$

where $H_{i,i+1}$ is a 3×3 projective transform or homography. A similar linear relationship for x and y holds in case of non-zero translation if a scene being recorded is approximately in one plane or at infinity.

In an example case of rolling shutter capturing method, $P_i$ and $P_{i+1}$ are not frame-global but vary across rows of pixels, for example. In this case, a camera position can be determined at times $T(s_x)$ and $T(s_y)$ when image or frame rows of pixels $s_x$ and $s_y$ including x and y are captured or readout.

Without loss of generality, the camera may be configured to begin capturing frame i at $T_i=0$, and readout time of each row can be determined from $T_i$:

$$T(s_x) = \frac{s_x}{N+d} \in [0, 1] \text{ and } T(s_y) = \frac{N+d+s_y}{N+d}, \qquad \text{Equation (2)}$$

where d is a camera dependent inter-frame delay, i.e., unit image rows between readout of last row N and first row of a next frame. A simplified notation $P(s_x)$ and $P(s_y)$ can be used to denote camera positions at times $T(s_x)$ and $T(s_y)$, respectively.

Equation (1) can be rewritten as:

$$x = H_i H_{i+1}^{-1} y \qquad \text{Equation (3)}$$

substituting $K_i R_i$ with an unknown projective transform or homography $H_i$. As described above, in the rolling shutter capturing method, the projective transform may depend on row indices $s_x$ and $s_y$ resulting in:

$$x = H(s_x) H^{-1}(s_y) y \qquad \text{Equation (4)}$$

Equation (4) in not limited to a case of zero translation, but may also hold if the scene being recorded is approximately in one plane or at infinity.

Equation (4) can be simplified by making an assumption that all pixels within a vicinity of row $s_x$ can be mapped to row $s_y$, i.e., relationship in equation (4) may depend on the row index $s_x$. The assumption may hold for arbitrary translations and small changes in scale, perspective, and rotation, suited for small inter-frame motion of the camera center while recording the video. The simplification can be expressed as follows:

$$x = H_x^{-1} y, \text{ with } H_x \approx H(s_x) H^{-1}(s_y) \qquad \text{Equation (5)}$$

In an example, $H_x$ can be estimated for each row of pixels in the frame. However, to improve computational efficiency, the frame can be divided into multiple blocks, such as block 602, and each block including multiple sets or rows of pixels. In addition to computational efficiency, for estimating an N degrees of freedom transform, N/2 features may be required, where each feature may give a constraint for x and y; using blocks of rows may ensure determining the N/2 features. A representative projective transform can be determined for each block. As an example, the frame can be divided into m=10 blocks, resulting in 10 unknown projective transforms $H_k$, k=1 ... m to be estimated per frame.

Referring back to FIG. 3, at block 308, the method 300 includes determining, for the set of pixels in the frame, a mixture transform based on a combination of the projective transform and respective projective transforms determined for other sets of pixels including the features in the frame. To model distortions resulting from the asynchronous capturing of rows of pixels, and to avoid discontinuity across blocks, a mixture transform can be determined for each row based on combining the projective transform of the block and respective projective transforms similarly determined for other blocks in the frame. For example, the mixture transform can include a weighted combination of the projective transform and the respective projective transforms.

Figure 6B:
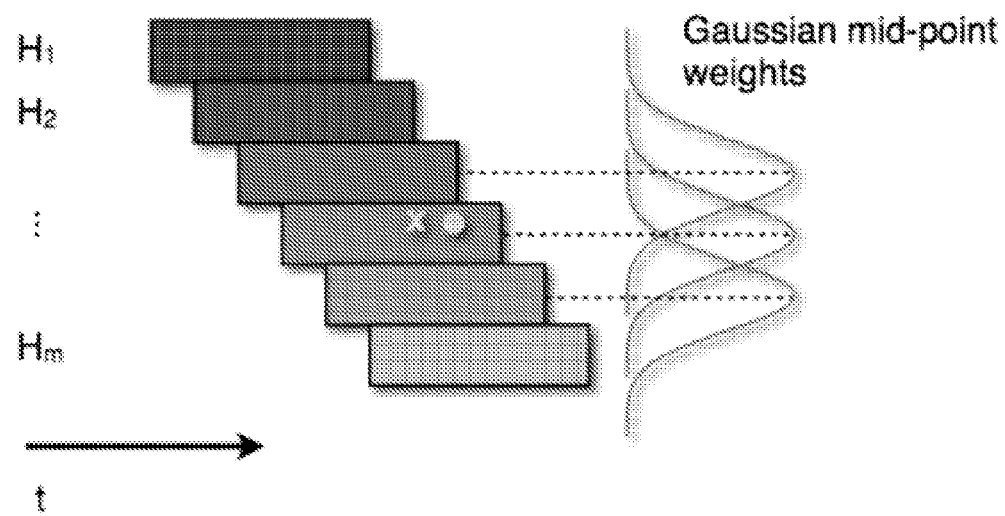
FIG. 6B illustrates an example for determination of a mixture transform, in accordance with an embodiment.

FIG. 6B illustrates an example for determination of a mixture transform, in accordance with an embodiment. FIG. 6B illustrates using a Gaussian distribution to estimate weights of weighted combination. For example, the mixture transform for point x can be defined as:

$$H_x := \sum_{k=1}^{m} H_k w_k(x) \quad \text{Equation (6)}$$

where $w_i(x)$ is a Gaussian weight centered around a middle row of each block i. As an example, a uniform standard deviation sigma=0.1 with respect to frame height can be used. Other methods can be used to estimate the weights such as cubic hermite splines and Catmull-Rom splines.

In an example, to determine a mixture transform of a row of pixels or a block of rows of pixels, a respective weight associated with the projective transform of the row of pixels may be based on a mean of the Gaussian distribution. Weights assigned to other rows of pixels or blocks may be based on spatial proximity or distance between a given row of the other rows of pixels and the row of pixels. For example, a smaller weight can be assigned to a respective row of pixels that is spatially farther, in the frame, from the row of pixels than another row of pixels that is spatially closer to the row of pixels.

Figure 7:
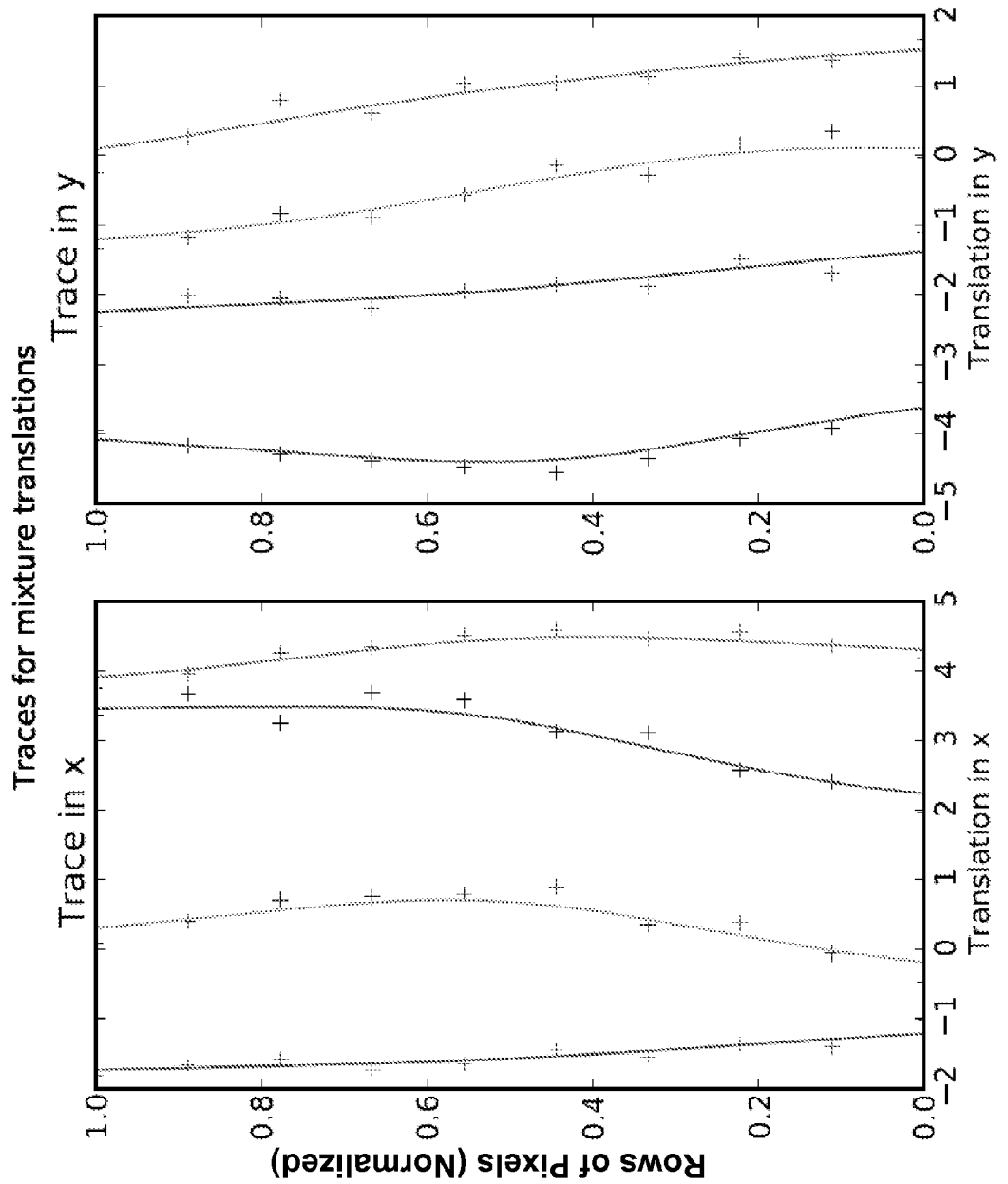
FIG. 7 illustrates an example of block dependent translations, in accordance with an embodiment.

FIG. 7 illustrates an example of block dependent translations, in accordance with an embodiment. In FIG. 7, crosses represent translation relating to respective blocks and solid lines represent interpolations using Gaussian weights as described in equation (6). Each solid line represents a given frame (4 frames are shown) and each point of a given solid line represents translation of a row of pixels between a respective frame and a consecutive frame determined using the interpolations. FIG. 7 illustrates translation degree of freedom and similar graphs can be generated for other degrees of freedom such as perspective and skew.

In an example, the mixture transform $H_x$ can be fit to a set of normalized matches $(x_i, y_i) \in [0,1] \times [0,1]$ by generalizing a normalized direct linear transform DLT to mixture models. For a given match $(x,y) = ([x_1, x_2, 1]^T, [y_1, y_2, 1]^T)$ expressed as three-dimensional (3D) vectors with the projective space $P^2$, equality after transformation holds up to scale:

$$0 = y \otimes H_x x = y \otimes \sum_{k=1}^{m} H_k w_k(x) x = \sum_{k=1}^{m} w_k(x) \cdot y \otimes H_k x \quad \text{Equation (7)}$$

where $\otimes$ denotes a cross product, and $w_k(x)$ is a known quantity and depends on x and a fixed middle position of block k. Using the DLT, the expression $y \otimes H_k x$ can be written as a set of 2 linear independent equations:

$$A_x^k h_k := \begin{pmatrix} 0^T & -x^T & y_2 x^T \\ x^T & 0^T & -y_1 x^T \end{pmatrix} h_k \quad \text{Equation (8)}$$

where $h_k$ is a vector formed by concatenating columns of $H_k$. Equation 7 can be solved by combining linearities for all the mixture models k yielding a 2×9 k linear constraint:

$$\underbrace{(w_1(x) A_x^1 \ \ldots \ w_k(x) A_x^k)}_{:=A_x} \underbrace{\begin{pmatrix} h_1 \\ \vdots \\ h_k \end{pmatrix}}_{:=h} := A_x h = 0 \quad \text{Equation (9)}$$

Aggregating all linear constraints $A_x$ for each feature match (x, y) yields a homogenous linear system, which can be solved for under a constraint $\|h\|_2 = 1$ using Singular Value Decomposition (SVD) of $A_x$. Alternatively, equation (9) can be transformed into a homogenous system by explicitly setting bottom right element of each transform to 1, i.e. $h_k(3,3) = 1 \forall k$.

Using Gaussian weights $w_k(x)$ may ensure smoothness across rows of pixels or blocks of rows of pixels. Further, to ensure that adjacent transforms $h_k$ do not differ significantly, a regularizer $\lambda \|h_k - h_{k-1}\|_2 = 1$ can be added to the homogenous system described by equation (9), where $\lambda = 1.5$, for example.

To further improve robustness with respect to outliers, h can be solved for using iterative least squares method. A geometric error $e_x := \|y \otimes H_x x\|_2$ can be evaluated after each iteration, and may be used to scale $A_x$ in equation (9) by an inverse error $$\frac{1}{e_x + \varepsilon}.$$

As residual wobble for high contrast regions may be more noticeable, the inverse error can further be scaled by a color variance of a surrounding patch in the frame, effectively approximating a patch-based error.

The mixture transform may account for translation, affine, and perspective degrees of freedom. In an example, not all degrees of freedom may be described in the mixture transform since not all degrees of freedom may vary across rows of pixels or blocks of rows of pixels.

A transform h can be parameterized as follows:

$$h = \begin{pmatrix} h_1 & h_2 & h_3 \\ h_4 & h_5 & h_6 \\ h_7 & h_8 & 1 \end{pmatrix} \quad \text{Equation (10)}$$

Figure 8:
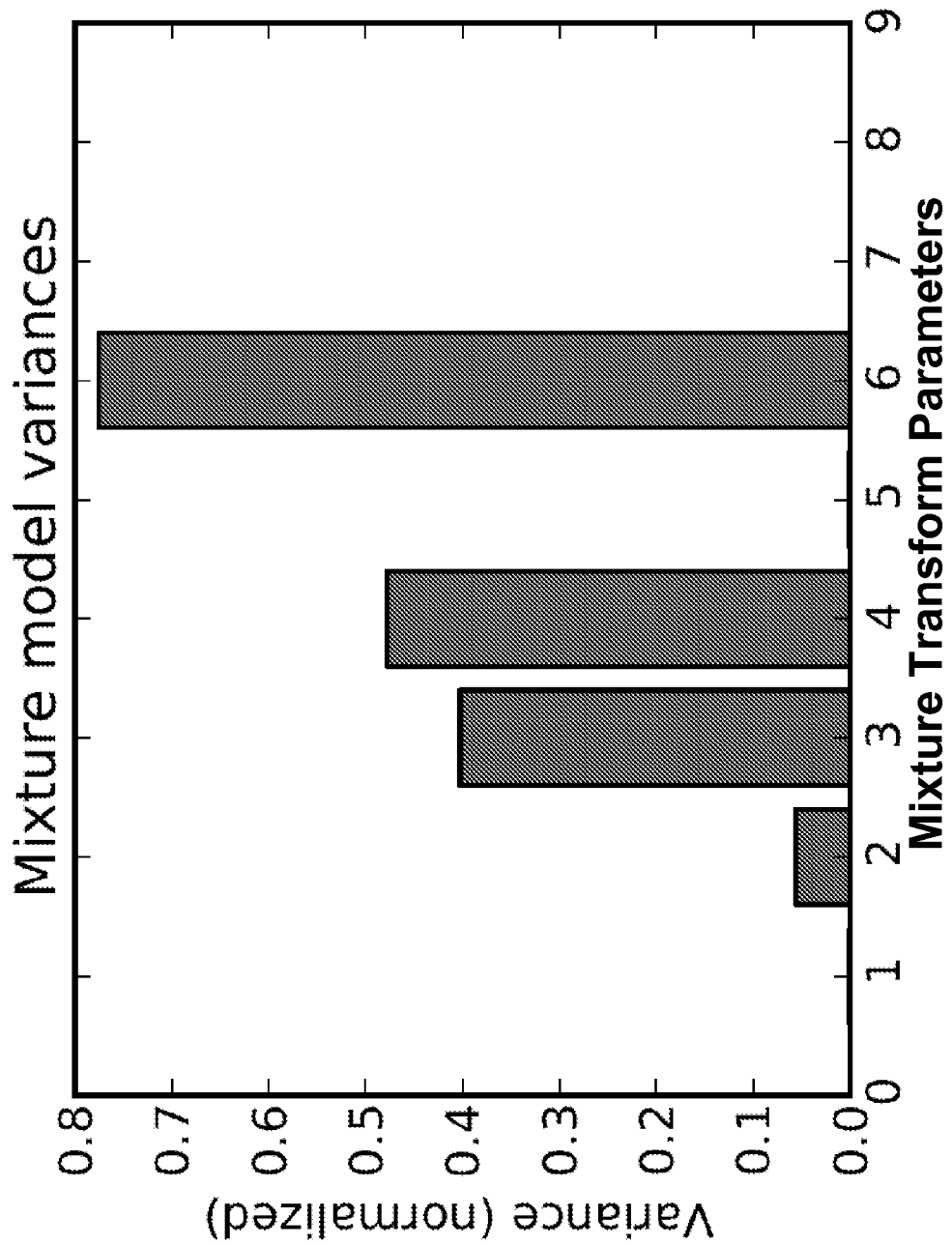
FIG. 8 illustrates examples of normalized variance for parameters of the mixture transform, in accordance with an embodiment.

FIG. 8 illustrates normalized variance for parameters of the mixture transform, in accordance with an embodiment. FIG. 8 shows eight degrees of freedom of a mixture transform h using parameterization shown in equation (10) and illustrates variance of the mixture transform parameters across blocks normalized with respect to a mean of respective parameters. FIG. 8 shows that perspective parameters ($h_7$, $h_8$) and scale parameters ($h_1$, $h_5$) can be regarded as constant (i.e., do not vary across blocks). However, translation parameters ($h_3$, $h_6$) and skew parameter $h_4$ vary across blocks.

Therefore, to improve computational efficiency, two reduced mixture models of 6+2 k and 4+4 k degrees of freedom, respectively, can be used instead of a full 2×9 k mixture model as described in equation (9). For example, the reduced mixture model can be expressed by using:

$$H_k = \begin{pmatrix} A & t_k \\ w^T & 1 \end{pmatrix}, \quad \text{Equation (11)}$$

and $$\hat{H}_k = \begin{pmatrix} a & b_k & t_k^x \\ c_k & d & t_k^y \\ w_1 & w_2 & 1 \end{pmatrix}$$

In equation (11), A is a frame-global 2×2 affine matrix, $w^T=(w_1, w_2)^T$ a frame-constant perspective part, and $t_k$ is a block varying translation expression. Similarly, a and d in $\hat{H}_k$ are frame-global scale parameters. This reduced model may increase computational efficiency and stability of solving for the mixture transform.

Referring back to FIG. 3, at block 310, the method 300 includes estimating a motion path of the camera based on the mixture transform and respective mixture transforms determined for the other sets of pixels to account for distortion associated with the sequential capturing of the plurality of sets of pixels in the frame. The mixture transform determined by the computing device may be considered as a motion model between the frame and the consecutive frame, and the motion model may include multiple degrees of freedom and accounts for rolling shutter distortions such as wobble and skew. Respective motion models of each pair of consecutive frames of the video can be determined similarly and can be transformed to a common coordinate system and concatenated to yield an estimated camera path over all frames of the video.

Further the computing device may be configured to stabilize the video by determining a smooth or optimal modified camera path P(t). For example, the smooth or optimal camera path P(t) can be partitioned into three segments, where only one may be present at each time t: a constant path, representing a static camera, i.e., $$\frac{dP}{dt} = 0,$$

a path of constant velocity, representing a panning or a dolly shot, i.e., $$\frac{d^2 P}{dt^2} = 0,$$

and a path of constant acceleration, representing an ease-in and out transition between static and panning cameras, i.e., $$\frac{d^3 P}{dt^3} = 0.$$

A connection of two different segments may have perceptively infinite acceleration, which may be noticeable as a sudden jerk in a video, and thus, a path of constant acceleration may be used. Given a continuous original camera path motion C(t), for example, a desired smooth path P(t) can be expressed as:

$$P(t)=C(t)*B_n(t) \quad \text{Equation (12)}$$

where $B_n(t)=C(t)^{-1}P(t)$ can be referred to as a crop window transform that can be applied to each video frame of the recorded video to obtain a stabilized video from a viewpoint of the smooth path P(t).

A steady or smooth camera path motion can be estimated by performing an L1 optimization with imposed constraints. An example constraint may include constraining a crop window associated with the crop window transform $B_n(t)$ to fit within frames of the video. The optimization, for example, may determine a stable camera path P(t) by minimizing an objective function:

$$O(P) = a\left|\frac{dP}{dt}\right| + b\left|\frac{d^2 P}{dt^2}\right| + c\left|\frac{d^3 P}{dt^3}\right| \quad \text{Equation (13)}$$

with linear weights a, b and c such that the crop window associated with $B_n(t)$ is constrained to fit within the frames of the video, for example. The crop window transform $B_n(t)$ may remove spatial content within the video or video frames to stabilize the video by applying the crop window associated with the crop window transform $B_n(t)$ to each video frame to remove all content outside the crop window. Equation (13) can be minimized by setting each derivative equal to zero, for example. Thus, the derivatives can be defined at different points along the camera path (e.g., per frame), and a derivative can be determined at every point (every frame).

The computed crop transform $B_n$ can be decomposed into $B_n=R_nS_n$, with $S_n$ being a 4 degree of freedom similarities $S_n$ (translation, scale, and rotation) and $R_n$ a residual. If perfect stabilization can be achieved, $R_n$ is zero, i.e. the crop transform compensates for any camera shake or motion. However, due to the additional constraint that the crop window associated with $B_n$ fits within frames of the video, $R_n$ may not be zero.

To account for distortion resulting from rolling shutter capturing, $S_n$ may be replaced with mixture transform $H_n$ determined for each pair of frames as described at block 308 of the method 300, yielding a per-frame rectification (rolling shutter distortion removal) and stabilization warp $\hat{B}_n=R_nH_n$. When the stabilization warp $\hat{B}_n$ is applied to frames of the video, the video is stabilized and rolling shutter distortions are removed.

FIGS. 9A-9B illustrates example of rolling shutter skew removal from frames of a video, in accordance with an embodiment. FIG. 9A shows an original frame exhibiting skew as a result of rolling shutter distortion. FIG. 9B shows a rectified frame using the calibration-free rolling shutter effects removal method 300. The skew shown in FIG. 9A is compensated for and the frame in FIG. 9B may approximately be skew-free.

FIGS. 9C-9D illustrates example of rolling shutter wobble removal from frames of a video, in accordance with an embodiment. FIG. 9C shows an original frame exhibiting local wobble, which compresses and stretches different parts of the frame. FIG. 9D shows a rectified frame using the calibration-free rolling shutter effects removal method 300. The wobble shown in FIG. 9C is compensated for and the frame in FIG. 9D may approximately be wobble-free.

To address potential error accumulation over time using $\hat{B}_n$, adaptively spaced key-frames can be used to minimize potential distortion. In an example, for a frame interval $F_i$, $F_{i+1} \ldots F_k$, the camera motion path can be determined, by the computing device, with respect to $F_i$ as homographies or transforms $H_1, H_2 \ldots H_k$. $H_l$, $l=1 \ldots k$ can be selected with least non-rigid distortion as next key-frame. To this end, each $H_k$ may be scored using 4 rigidity measures: skew, change in aspect ratio (obtained by applying QR decomposition to $H_k$), modulus of perspective, and average feature residual after registration. Considering variance of each measure across frames, rigidity may be defined using a normal distribution around mean zero (respectively mean one for aspect ratio). Lastly, assuming independence of the four measures, $H_l$ may be determined at the frame $l=1 \ldots k$ of highest probability, i.e., highest rigidity.

Figure 10:
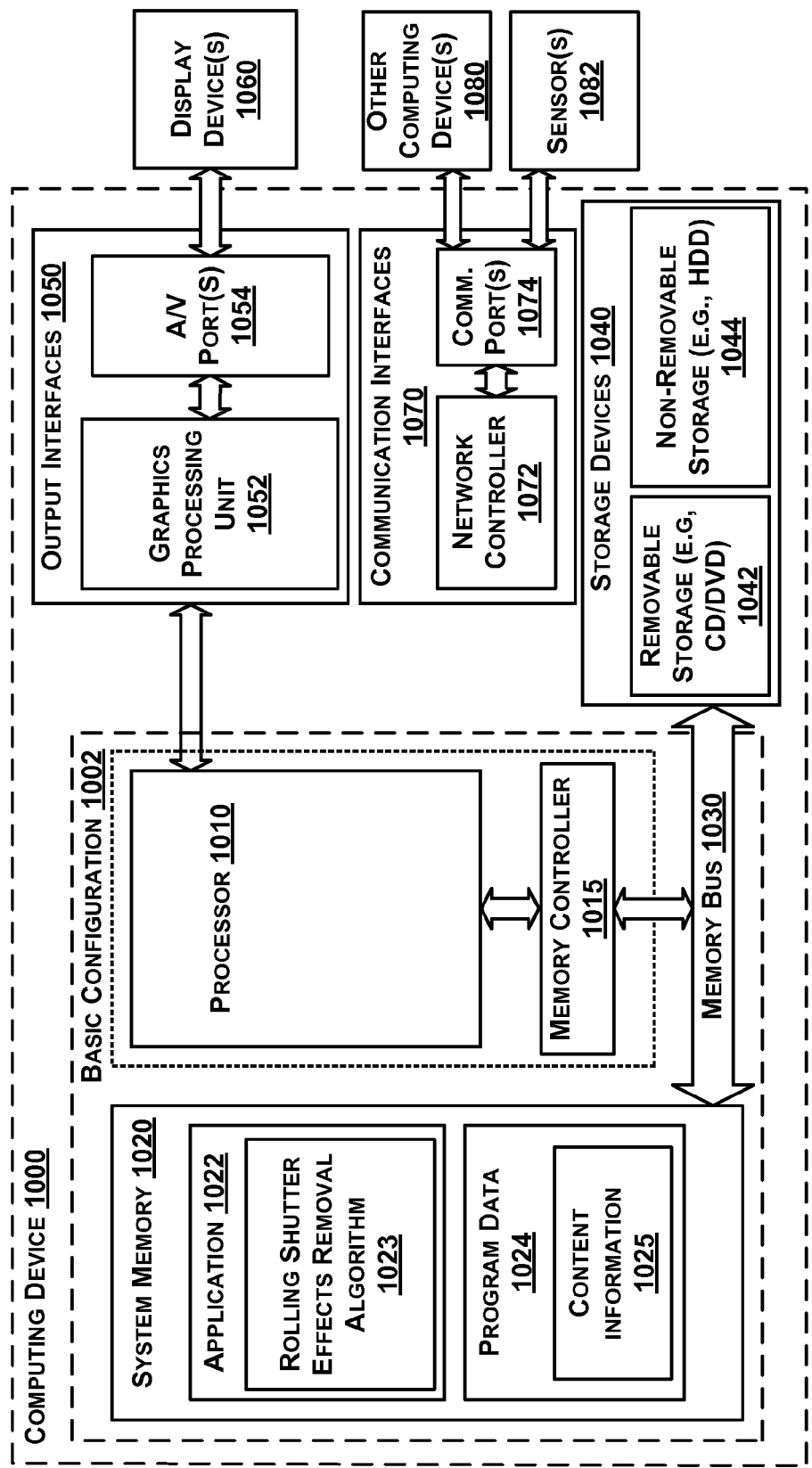
FIG. 10 is a functional block diagram illustrating an example computing device used in a computing system that is arranged in accordance with at least some embodiments described herein.

FIG. 10 is a functional block diagram illustrating an example computing device 1000 used in a computing system that is arranged in accordance with at least some embodiments described herein. The computing device may be a personal computer, mobile device, cellular phone, video game system, or global positioning system, and may be implemented as a client device, a server, a system, a combination thereof, or as a portion of components described in FIGS. 1-2. In a basic configuration 1002, computing device 1000 may include one or more processors 1010 and system memory 1020. A memory bus 1030 can be used for communicating between the processor 1010 and the system memory 1020. Depending on the desired configuration, processor 1010 can be of any type including but not limited to a microprocessor (µP), a microcontroller (µC), a digital signal processor (DSP), or any combination thereof. A memory controller 1015 can also be used with the processor 1010, or in some implementations, the memory controller 1015 can be an internal part of the processor 1010.

Depending on the desired configuration, the system memory 1020 can be of any type including but not limited to volatile memory (such as RAM), non-volatile memory (such as ROM, flash memory, etc.) or any combination thereof. System memory 1020 may include one or more applications 1022, and program data 1024. Application 1022 may include optimal and dynamic crop algorithm 1023 that is arranged to provide inputs to the electronic circuits, in accordance with the present disclosure. Program Data 1024 may include content information 1025 that could be directed to any number of types of data. In some example embodiments, application 1022 can be arranged to operate with program data 1024 on an operating system.

Computing device 1000 can have additional features or functionality, and additional interfaces to facilitate communications between the basic configuration 1002 and any devices and interfaces. For example, data storage devices 1040 can be provided including removable storage devices 1042, non-removable storage devices 1044, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 1020 and storage devices 1040 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 1000. Any such computer storage media can be part of the computing device 1000.

Computing device 1000 can also include output interfaces 1050 that may include a graphics processing unit 1052, which can be configured to communicate to various external devices such as display devices 1060 or speakers via one or more A/V ports 1054 or a communication interface 1070. The communication interface 1070 may include a network controller 1072, which can be arranged to facilitate communications with one or more other computing devices 1080 and one or more sensors 1082 over a network communication via one or more communication ports 1074. The one or more sensors 1082 are shown external to the computing device 1000, but may also be internal to the device. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

In some embodiments, the disclosed methods may be implemented as computer program instructions encoded on a computer-readable storage media in a machine-readable format, or on other non-transitory media or articles of manufacture. FIG. 11 is a schematic illustrating a conceptual partial view of an example computer program product 1100 that includes a computer program for executing a computer process on a computing device, arranged according to at least some embodiments presented herein. In one embodiment, the example computer program product 1100 is provided using a signal bearing medium 1101. The signal bearing medium 1101 may include one or more program instructions 1102 that, when executed by one or more processors may provide functionality or portions of the functionality described above with respect to FIGS. 1-10. Thus, for example, referring to the embodiments shown in FIG. 3 one or more features of blocks 302-310 may be undertaken by one or more instructions associated with the signal bearing medium 1101. In addition, the program instructions 1102 in FIG. 11 describe example instructions as well.

In some examples, the signal bearing medium 1101 may encompass a computer-readable medium 1103, such as, but not limited to, a hard disk drive, a Compact Disc (CD), a Digital Video Disk (DVD), a digital tape, memory, etc. In some implementations, the signal bearing medium 1101 may encompass a computer recordable medium 1104, such as, but not limited to, memory, read/write (R/W) CDs, R/W DVDs, etc. In some implementations, the signal bearing medium 1101 may encompass a communications medium 1105, such as, but not limited to, a digital and/or an analog communication medium (e.g., a fiber optic cable, a waveguide, a wired communications link, a wireless communication link, etc.). Thus, for example, the signal bearing medium 1101 may be conveyed by a wireless form of the communications medium 1105 (e.g., a wireless communications medium conforming to the IEEE 802.11 standard or other transmission protocol).

The one or more programming instructions 1102 may be, for example, computer executable and/or logic implemented instructions. In some examples, a computing device such as the computing device 1000 of FIG. 10 may be configured to provide various operations, functions, or actions in response to the programming instructions 1102 conveyed to the computing device 1000 by one or more of the computer readable medium 1103, the computer recordable medium 1104, and/or the communications medium 1105. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   determining, by a computing device, in a frame of a video captured by a camera, features with a distinguishable geometric characteristic, wherein the frame includes a plurality of rows of pixels captured sequentially in time;
   determining, for a pixel representing a feature of the features in the frame, a corresponding pixel representing the feature in a consecutive frame in the video;
   determining, for a set of rows of pixels including the pixel in the frame, a projective transform based on (i) a first position of the camera at which the set of rows of pixels is captured, and (ii) a second position of the camera at which a corresponding set of rows of pixels including the corresponding pixel in the consecutive frame is captured, wherein the projective transform represents motion of the camera from the first position to the second position;
   determining, for the set of rows of pixels in the frame, a mixture transform based on a combination of the projective transform and respective projective transforms determined for other sets of rows of pixels including the features in the frame; and
   estimating, by the computing device, a motion path of the camera based on the mixture transform and respective mixture transforms determined for the other sets of rows of pixels to account for distortion associated with the sequential capturing of the plurality of rows of pixels in the frame.

2. The method of claim 1, wherein estimating the motion path of the camera comprises concatenating mixture transforms across frames of the video to yield an estimated camera path over all frames of the video.

3. The method of claim 1, wherein the distinguishable geometric characteristic includes a location at an intersection of two lines depicted in the frame.

4. The method of claim 1, wherein determining, in the frame, the features comprises:
   dividing the frame into a grid having multiple bins;
   determining respective features with the distinguishable geometric characteristic in each bin of the multiple bins; and
   performing, locally in each bin, outlier rejection to remove pixels lacking locally consistent motion.

5. The method of claim 1, wherein determining for the set of rows of pixels, the mixture transform based on the combination of the projective transform and the respective projective transforms comprises determining a weighted combination of the projective transform and the respective projective transforms.

6. The method of claim 5, further comprising determining respective weights of the weighted combination based on distance between respective sets of rows of pixels and the set of rows of pixels.

7. The method of claim 5, wherein weights of the weighted combination are estimated using a Gaussian distribution, wherein a respective weight associated with the projective transform of the row of pixels is based on a mean of the Gaussian distribution.

8. The method of claim 1, wherein estimating the motion path of the camera based on the mixture transform and the respective mixture transforms determined for the other sets of rows comprises using a regularizer of a form $\lambda \|h_k - h_{k-1}\|_2 = 1$ between pairs of mixture transforms $h_k$ and $h_{k-1}$ of spatially adjacent sets of rows in the frame.

9. The method of claim 1, wherein determining the mixture transform comprises keeping one or more of perspective and scale degrees of freedom constant across sets of pixels in the frame, and allowing one or more of skew, rotation, and translation degrees of freedom to vary across the sets of rows.

10. The method of claim 1, further comprising:
    determining a crop window transform to transform the motion path of the camera into a modified motion camera path;
    removing, from the video, the distortion associated with the asynchronous capturing of the plurality of rows of pixels in the frame, based on the estimated motion path of the camera; and
    applying the crop window transform to the video to provide a modified video from a viewpoint of the modified motion camera path.

11. The method of claim 10, wherein the modified motion camera path includes a substantially constant path.

12. The method of claim 10, wherein the modified motion camera path includes a substantially constant velocity path.

13. The method of claim 10, wherein the modified motion camera path includes a substantially constant acceleration path.

14. The method of claim 10, wherein applying the crop window transform to the video to provide the modified video from the viewpoint of the modified motion camera path comprises removing content from the video.

15. The method of claim 10, wherein applying the crop window transform to the video to provide the modified video from the viewpoint of the modified motion camera path comprises stabilizing the video.

16. A non-transitory computer readable medium having stored thereon instructions executable by a computing device to cause the computing device to perform functions comprising:

determining in a frame of a video captured by a camera, features with a distinguishable geometric characteristic, wherein the frame includes a plurality of sets of pixels captured sequentially in time;

determining, for a pixel representing a feature of the features in the frame, a corresponding pixel representing the feature in a consecutive frame in the video;

determining, for a set of pixels including the pixel in the frame, a projective transform based on (i) a first position of the camera at which the set of pixels is captured, and (ii) a second position of the camera at which a corresponding set of pixels including the corresponding pixel in the consecutive frame is captured, wherein the projective transform represents motion of the camera from the first position to the second position;

determining, for the set of pixels in the frame, a mixture transform based on a combination of the projective transform and respective projective transforms determined for other sets of pixels including the features in the frame; and estimating a motion path of the camera based on the mixture transform and respective mixture transforms determined for the other sets of pixels to account for distortion associated with the sequential capturing of the plurality of sets of pixels in the frame.

17. The non-transitory computer readable medium of claim 16, wherein estimating the motion path of the camera comprises concatenating mixture transforms across frames of the video to yield an estimated camera path over all frames of the video.

18. The non-transitory computer readable medium of claim 16, wherein the function of determining for the set of pixels, the mixture transform based on the combination of the projective transform and the respective projective transforms comprises determining a weighted combination of the projective transform and the respective projective transforms.

19. The non-transitory computer readable medium of claim 18, wherein the instructions are further executable by the computing device to cause the computing device to perform functions comprising determining weights of the weighted combination, based on distance between respective sets of pixels and the set of pixels.

20. A system comprising:

a feature extraction module configured to determine, in a frame of a video captured by a camera, features with a distinguishable geometric characteristic, wherein the frame includes a plurality of sets of pixels captured sequentially in time, and the feature extraction module is configured to determine, for a pixel representing a feature of the features in the frame, a corresponding pixel representing the feature in a consecutive frame in the video;

a transformation module in communication with the feature extraction module and configured to determine, for a set of pixels including the pixel in the frame, a projective transform based on (i) a first position of the camera at which the set of pixels is captured and (ii) a second position of the camera at which a corresponding set of pixels including the corresponding pixel in the consecutive frame is captured, wherein the projective transform represents motion of the camera from the first position to the second position, and the transformation module is configured to determine, for the set of pixels in the frame, a mixture transform based on a combination of the projective transform and respective projective transforms determined for other sets of pixels including the features in the frame; and a camera path estimation module in communication with the feature extraction module and the transformation module and configured to estimate a motion path of the camera based on the mixture transform and respective mixture transforms determined for the other sets of pixels to account for distortion associated with the sequential capturing of the plurality of sets of pixels in the frame.

21. The system of claim 20, further comprising a video stabilization module in communication with the feature extraction module and the camera path estimation module and configured to determine a crop window transform to transform the motion path of the camera into a modified motion camera path, wherein the video stabilization module is configured to remove, from the video, the distortion associated with the sequential capturing of the plurality of sets of pixels in the frame, based on the estimated motion path of the camera, and the video stabilization module is configured to apply the crop window transform to the video to provide a modified video from a viewpoint of the modified motion camera path.

22. The system of claim 21, further comprising a server that comprises the feature extraction module, the transformation module, the camera path estimation module, and the video stabilization module.

23. The system of claim 22, wherein the server is configured to:

receive the video;

receive a single command by a single action requesting removing distortion due to the sequential capturing of the plurality of sets of pixels, and stabilizing the video; and upload the modified video to a video hosting website.

* * * * *